United States Patent [19]
Kleyn

[11] Patent Number: 5,398,839
[45] Date of Patent: Mar. 21, 1995

[54] COMPARTMENTED FUEL TANK WITH FUEL ABSORBENT MATERIAL

[75] Inventor: Hendrik Kleyn, Grandville, Mich.

[73] Assignee: Kleyn Die Engravers, Inc., Jenison, Mich.

[21] Appl. No.: 957,248

[22] Filed: Oct. 6, 1992

[51] Int. Cl.6 .......................................... B60K 15/077
[52] U.S. Cl. .................................. 220/421; 220/422; 220/564; 220/4.14; 220/555
[58] Field of Search ............... 220/564, 563, 562, 421, 220/422, 445, 444, 466, 900, 905, 4.14, 4.13, 4.12, 501, 507, 555, 4.05

[56] References Cited

U.S. PATENT DOCUMENTS

| 1,393,719 | 10/1921 | De Save | 220/564 |
|---|---|---|---|
| 1,878,063 | 9/1932 | Todd. | |
| 2,354,701 | 8/1944 | Pescara. | |
| 2,391,477 | 12/1945 | Phillips. | |
| 2,461,096 | 2/1949 | Wagner. | |
| 2,533,431 | 12/1950 | Chausson | 220/4.14 X |
| 2,806,622 | 9/1957 | Leirer. | |
| 3,067,869 | 12/1962 | Denton | 220/555 |
| 3,129,014 | 4/1964 | Hutchison et al.. | |
| 3,426,937 | 2/1969 | Boschi et al.. | |
| 3,595,422 | 7/1971 | Durrett, Jr. et al.. | |
| 3,804,292 | 4/1974 | Chiti | 220/563 X |
| 3,931,907 | 1/1976 | Henle | 220/564 |
| 4,185,750 | 1/1980 | Op den Camp | 220/555 X |
| 4,453,564 | 6/1984 | Bergesio. | |
| 4,526,286 | 7/1985 | Jung et al.. | |
| 4,635,814 | 1/1987 | Jones | 220/466 X |
| 4,886,180 | 12/1989 | Bonczyk. | |
| 4,909,530 | 3/1990 | Tsukada et al.. | |
| 4,930,811 | 6/1990 | Tsukada et al.. | |
| 5,020,687 | 6/1991 | Seizert. | |
| 5,133,588 | 7/1992 | Hutchinson et al.. | |

OTHER PUBLICATIONS

Dialog computer printout regarding article entitled "Plastic Fuel Tank Bladder Cuts Explosion Hazard" from the Mar. 1990 issue of *Plastics World*.
Dialog computer printout regarding article entitled "Multilayered Plastic Fuel Tank" from the Feb. 1990 issue of *Japanese New Materials Advanced Plastics*.
Dialog computer printout for article entitled "Plastic Fuel Tanks to Meet Stricter Laws" from the Jan. 13, 1992 issue of *Plastic News*.
Nochar, "A64OR" Fact Sheet, date unknown.

*Primary Examiner*—Stephen J. Castellano
*Attorney, Agent, or Firm*—Warner Norcross & Judd

[57] ABSTRACT

A fuel tank is disclosed having an inner shell, an outer shell enveloping the inner shell, and a fuel absorbent material filling the space between the inner shell and the outer shell. The fuel absorbent material is preferably a molded granular material. The inner shell is an assembly of injection molded plastic halves joined together along peripheral flanges, each inner shell half being integrally formed with internal walls. The internal walls are formed with undercut openings. The outer shell is an assembly of outer shell halves joined together along peripheral flanges. Also disclosed is an injection molding apparatus adapted to manufacture the inner shell halves with undercut openings in the internal walls.

16 Claims, 7 Drawing Sheets

COMPARTMENTED FUEL TANK WITH FUEL ABSORBENT MATERIAL

BACKGROUND OF THE INVENTION

1. Field of the Invention

The present invention relates to a liquid fuel tank and, more particularly, to a double-shell tank having fuel absorbent material disposed between an inner shell and an outer shell, and to such a tank made of molded plastic material.

2. Description of the Related Art

In the design and construction of fuel tanks, the avoidance and prevention of leakage is a matter of utmost concern. When a tank is used in a motor vehicle to store fuel, such as gasoline, it is particularly important that the tank should be able to sustain an impact without releasing its contents.

Improved plastics molding techniques have made it possible to manufacture fuel tanks made of plastic material. As with older metal tanks, such plastic tanks must also be made to prevent the escape of the fuel contained within.

In the past, tanks have been constructed with an outer envelope and sealing compound beneath the outer envelope. If the tank is penetrated, the sealing compound flows together to close the hole. If, however, the inner tank leaks, the escaping fuel is not absorbed by the sealing compound. Also in the past, tanks have been constructed with an outer envelope and layers of sponge rubber beneath the outer envelope as a shock absorbing material. The sponge rubber is not effective in taking up any fuel leaking from the inner tank.

SUMMARY OF THE INVENTION

The present invention provides a molded plastic fuel tank having an inner shell enclosing a space in which fuel is contained, an outer shell enveloping the inner shell and defining a space between the inner shell and the outer shell, and a fuel absorbent material disposed between the inner shell and the outer shell. Any fuel leaking from the inner shell is absorbed by the fuel absorbent material and prevented from escaping to the environment.

According to a feature of the invention, the inner shell is constructed as a pair of molded plastic shell halves having peripheral flanges heat welded together. The interior of the inner shell is formed with internal walls which strengthen and rigidify the structure, and which prevent excessive sloshing of the fuel. The internal walls are formed with openings to allow the fuel to pass through the internal walls. The outer shell is constructed as a pair of molded plastic shell halves having peripheral flanges secured together with mechanical fasteners.

According to another feature, the inner shell is formed with openings having necks extending outwardly through the absorbent material and through corresponding apertures formed in the outer shell. Resilient gaskets are placed around the necks to form a fuel-tight seal where the necks penetrate the outer shell.

According to an additional feature, the internal walls of the inner shell are arranged such that the internal walls are more closely spaced along the perimeter of the inner shell than at the center of the shell. This arrangement enhances the strength and rigidity of the tank.

Also disclosed is a plastic injection molding apparatus specially adapted for the manufacture of the inner shell halves and the undercut openings in the internal walls of the shell halves.

These and other objects, advantages, and features of the present invention will be more fully understood and appreciated by reference to the written specification and appended drawings.

DESCRIPTION OF THE PREFERRED EMBODIMENT

Figure 1:
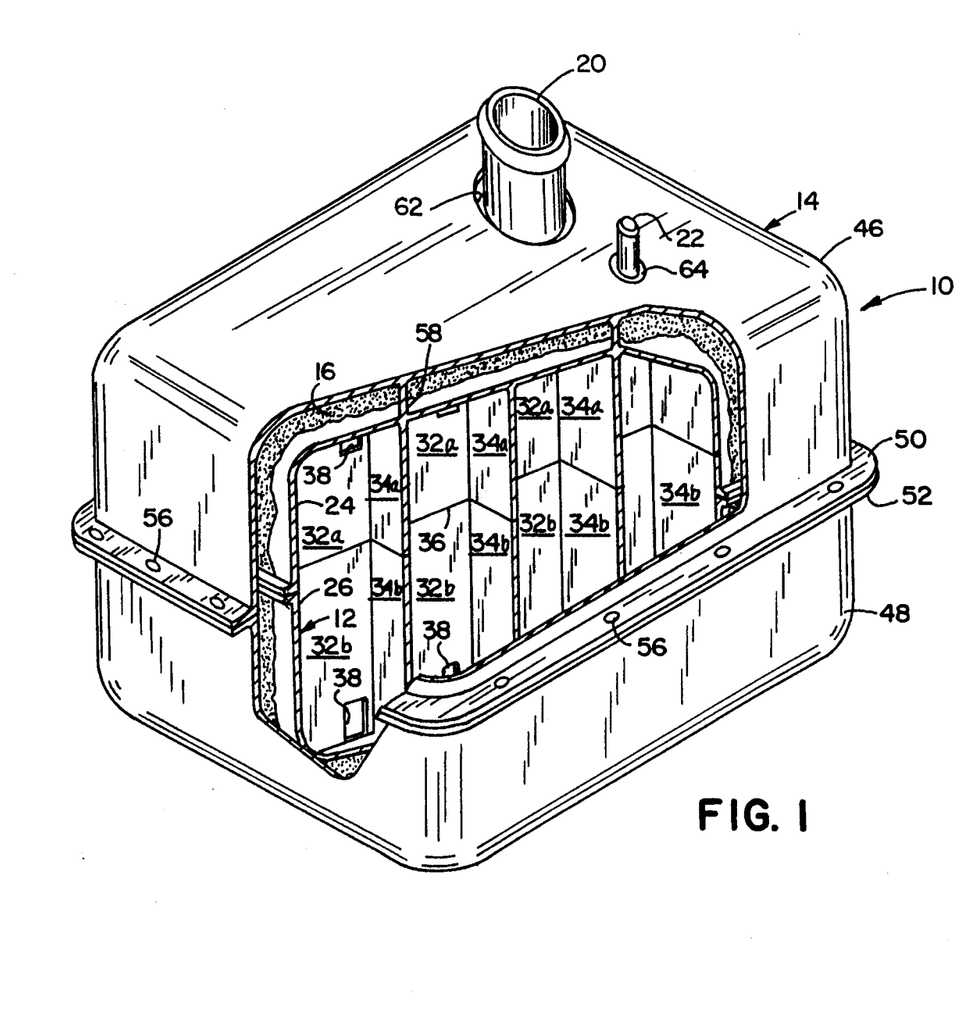
FIG. 1 is a perspective view, with parts cut away, of a fuel tank according to the principles of the invention.
Figure 2:
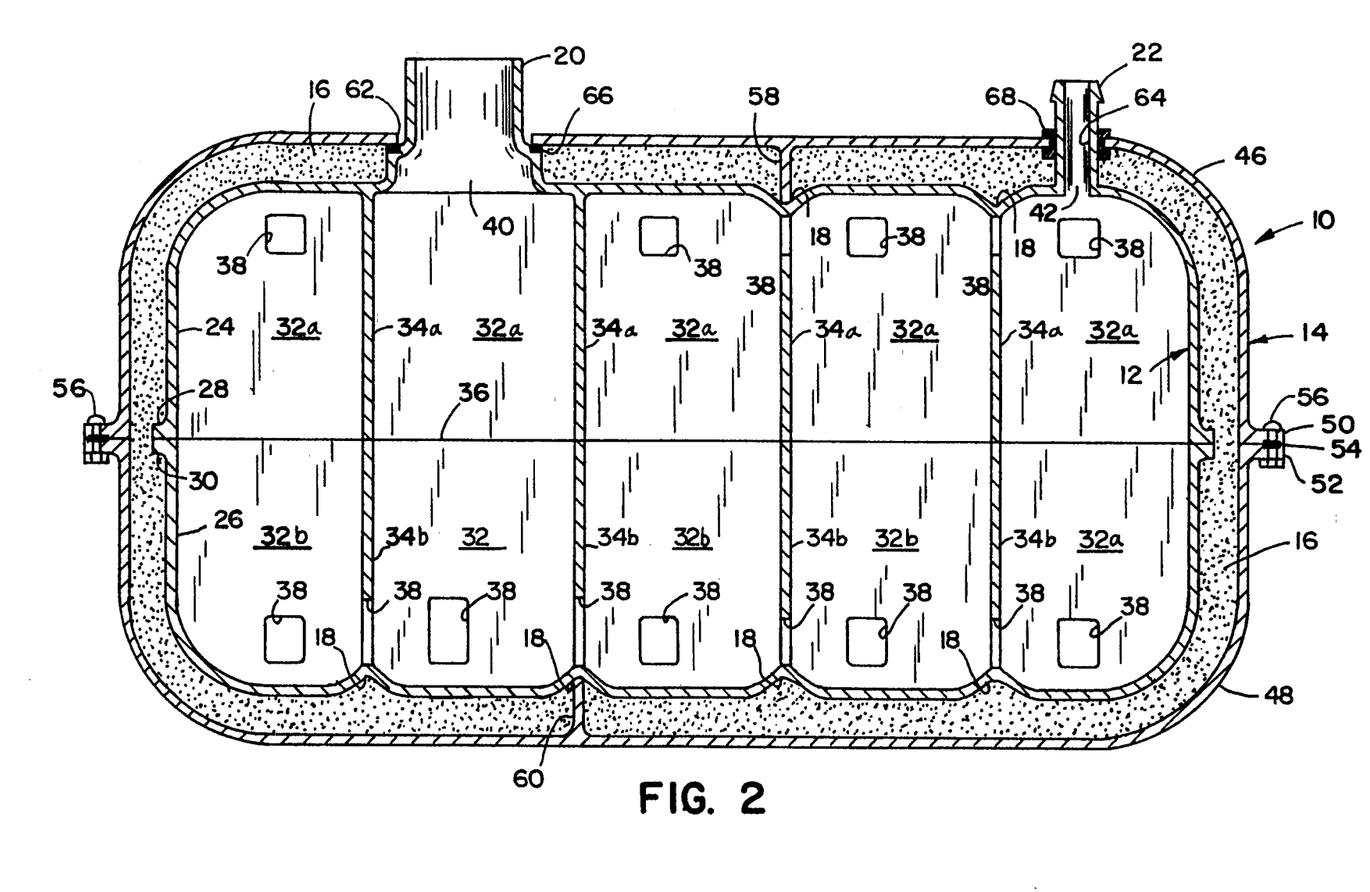
FIG. 2 is a elevational, sectional view of a second embodiment of the fuel tank.

By way of disclosing preferred embodiments, and not by way of limitation, there is shown in FIG. 1 and 2, generally rectangular fuel tanks 10 and 10' which include in their general organization an inner shell 12, an outer shell 14, and a fuel absorbent material 16 disposed between the inner and outer shells. The outer shell 14 is larger than the inner shell 12 and extends outwardly beyond inner shell in all directions. The space between the two shells envelops the inner shell and is occupied and filled substantially entirely by the fuel absorbent material 16.

The embodiment of FIG. 2 is substantially similar to the embodiment of FIG. 1. In FIG. 2, the outer surface of the inner shell is formed with indentations 18, whereas in FIG. 1 the outer surface is flat. The placement of the filler neck 20 and the outlet neck 22 varies between the two embodiments. In other respects, the two embodiments are similar to the extent that the same reference numbers are used for the like elements of both embodiments.

Inner shell 12 is an assembly of a upper inner shell half 24 and lower inner shell half 26. The perimeter of the upper inner shell half 24 is formed with a flange 28. Similarly, the perimeter of the lower inner shell half 26 is formed with flange 30. The flanges 28 and 30 are mated and affixed together by a suitable means, preferably by heat welding, so as to form a liquid and vapor tight seal.

The interior of the inner shell is divided into an array of cells by several longitudinally and laterally extending internal walls 32a, 32b, 34a, and 34b integrally formed with the upper and lower inner shell halves 24, 26. Each internal wall is formed as a single thickness, or layer, of plastic material. The edges of the internal walls of the two inner shell halves meet along a seam 36 lying in the same plane defined by the mating surfaces of the flanges 28, 30. The internal walls are formed with openings 38 which allow the liquid in the tank to pass from cell to cell. The internal walls add strength and rigidity to the inner shell and prevent excessive sloshing of the contents of the tank.

Filler neck 20 and outlet neck 22 are formed integrally with the upper inner shell half 24 and are in communication with filler opening 40 and outlet opening 42, respectively. Other necks and openings may be provided as desired, such as for connection to a vapor recovery system.

Outer shell 14 is an assembly of an upper outer shell half 46 mated to a lower outer shell half 48. Each outer shell half is formed with a peripheral flange 50, 52. A resilient gasket 54 is placed between the flanges 50, 52. Fasteners such as screws 56 are inserted through the mated flanges to affix the outer shell halves together. When the outer shell halves thus assembled and sealed together, the outer shell 14 substantially envelops and encloses the inner shell 12.

The outer shell halves 46, 48 are preferably integrally formed with internal spacer walls 58, 60 which contact the exterior of the inner shell 12. Spacer walls 58, 60 serve to position the inner and outer shells properly with respect to each other. The outer shell is further formed with apertures 62, 64 which lie in correspondence with the filler neck 20 and the outlet neck 22. The necks 20, 22 pass outwardly through the apertures 62, 64. Suitable gaskets 66, 68 are placed at the junctures of the apertures 62, 64 and the necks 20, 22 to form seals where the outer shell is penetrated by the necks.

Fuel absorbent material 16 is disposed to the exterior of the inner shell 12 and to the interior of the outer shell 14. Thus, the fuel absorbent material envelops the inner shell. As used herein, the term "fuel absorbent" is intended to denote the ability of the material to take up or immobilize the fuel and prevent the fuel from escaping to the environment. Preferably, the fuel absorbent material is an initially flowable material which is consolidated and molded to form shaped panels which fit into the space between the inner and outer shells such that the entirety of the space between the shells is filled. Also, the fuel absorbent may possess fire retardant properties. One suitable material is a dry, initially granular, fire retarded, bonding agent sold under the designation "A640R" by the nochar company, 10333 N. Meridien, Suite 215, Indianapolis, Ind. 46290.

Figure 3:
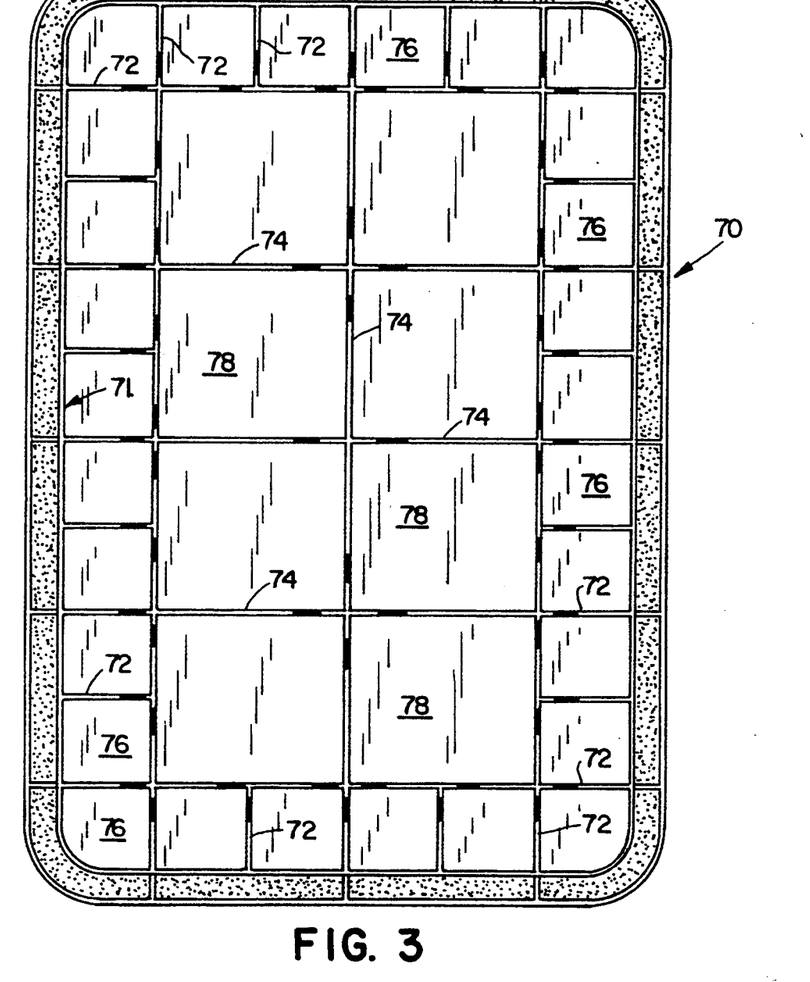
FIG. 3 is a plan, sectional view of a third embodiment of the fuel tank.
Figure 4:
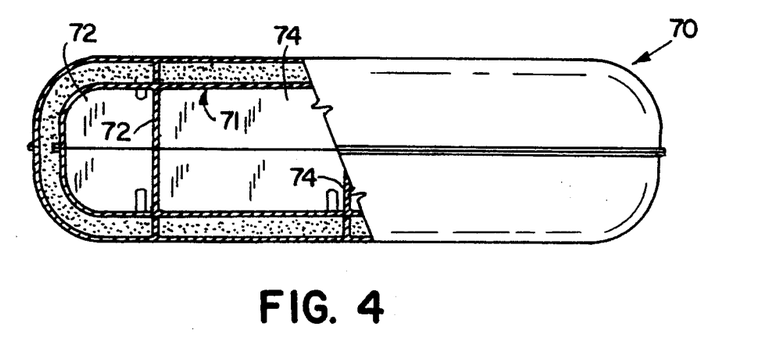
FIG. 4 is an end, elevational view of the tank of FIG. 3 with parts cut away.

A third embodiment of the tank 70 of the invention is shown in FIGS. 3 and 4. In this embodiment, The internal walls of the inner shell 71 are spaced more closely together along the perimeter of the inner shell than in the center of the shell. Thus, the perimeter internal walls 72 are relatively shorter, more closely spaced, and more numerous, while the central internal walls 74 are relatively longer, less closely spaced, and less numerous. Correspondingly, the internal cells 76 disposed about the periphery of the inner shell are relatively smaller, while the central cells 78 are relatively larger. This arrangement enhances the rigidity and strength of the tank while at the same time making economical use of the material from which the inner shell is made.

The inner shell halves are preferably made of injection molded plastic material. Suitable materials include polypropylene. The outer shell halves are also preferably made of injection molded plastic material. Suitable materials for the outer shell include polyethylene and polypropylene.

It is desirable to form the openings 38 in the inner shell halves 24, 26 simultaneously with the manufacture of the inner shell halves in an injection molding machine. The openings 38 are undercut, meaning that the openings are disposed such that the shell halves cannot be removed from a male mold unless the mold is specially equipped for release from the undercut openings. A preferred molding apparatus is shown in various configurations in FIGS. 5-11.

Figure 5:
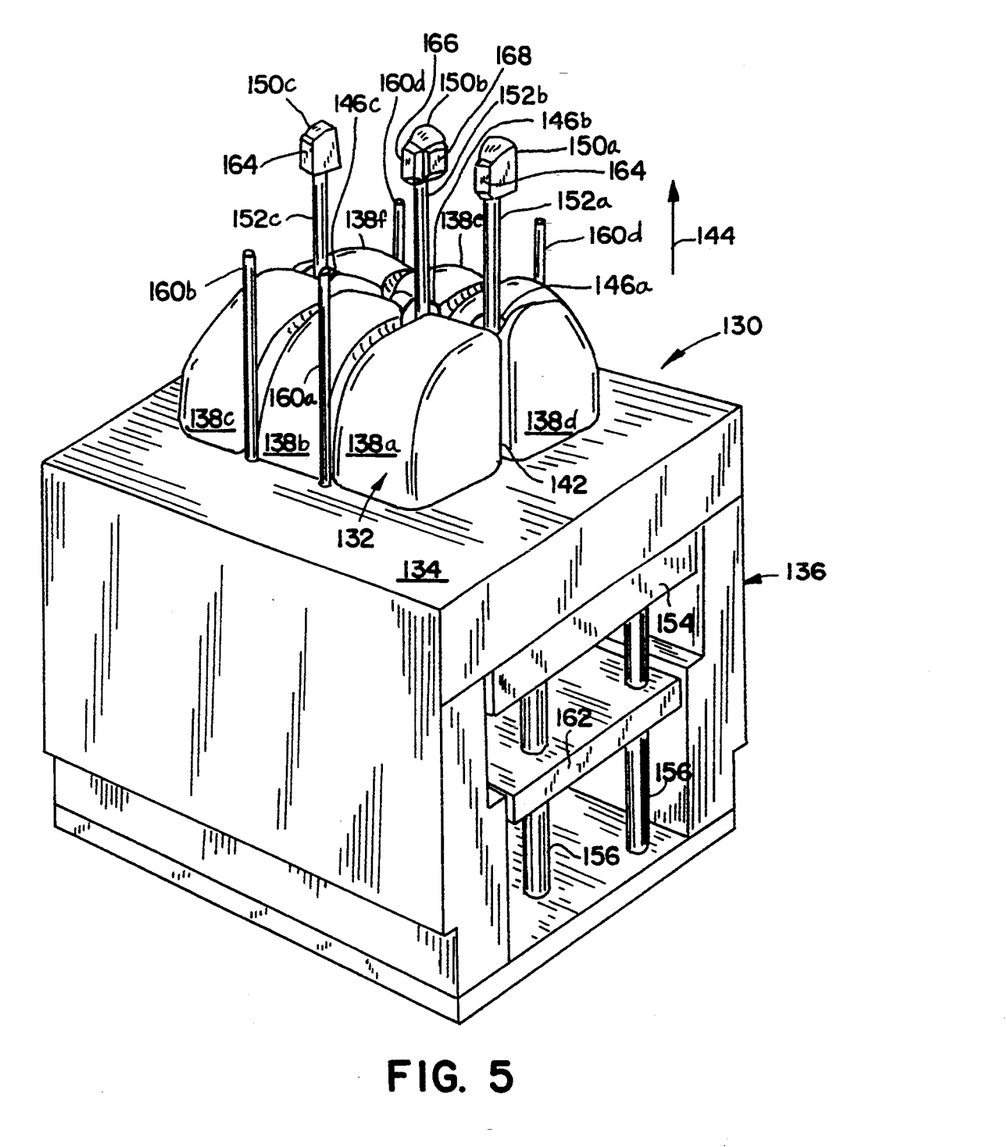
FIG. 5 is a perspective view of a male mold and mold base adapted for manufacturing the halves of the inner shell of the tank.

There is shown in FIG. 5 a molding apparatus 130 having a male mold 132 affixed to the outwardly directed surface 134 of a mold base 136. The male mold includes several projections 138a-138f which form the cells defined by the internal walls of an inner shell half to be formed on the mold. Between adjacent pairs of the projections there are formed voids, such as void 142, in which the internal walls of the tank half are formed.

It should be understood that the molding apparatus is shown in various configurations in FIGS. 5 and 8-11, and that these configurations do not necessarily conform to the shape of the inner shell halves shown in FIGS. 1-4. These various configurations are included to disclose the constructional and operational features of the molding apparatus as will be apparent from the following description. The molding apparatus may be configured to produce inner shell halves having any number or arrangement of cells. All that is required is that the inner shell half have one or more undercut openings extending transversely to the direction in which the inner shell half is removed from the mold.

The projections 138a-138f extend outwardly from the mold generally in the same direction in which the inner shell halves will be removed from the mold as indicated by arrow 144. The direction denoted by arrow 144 is referred to herein as "outward" and is intended to refer to the direction in which the inner shell half moves substantially away from the male mold after molding is complete. In the embodiment of FIG. 3, this direction is substantially perpendicular to the mold face 134. Where the inner shell half is to be formed with undercuts, the projections are formed with recesses, such as recesses 146a-146c in projections 138d-138f, respectively.

Lifter heads 150a-150c are shown in their fully extended position. When retracted, the lifter heads are received within the corresponding recesses 146a-146c. The lifter heads are affixed to the outer ends of lifter rods 152a-152c. The lifter rods extend through the recesses 146a-146 and through holes formed through the mold base 136. The inner ends of the lifter rods 152a-152c are affixed to a lifter plate 154 which is mounted on guide rods 156 for outward movement to extend the lifter heads, and for inward movement to retract the lifter heads into the recesses 146a-146c.

Ejector pins 160a-160d are shown in their partially extended position. When retracted, the outer ends of the ejector pins lie flush with the mold face 134. The ejector pins are positioned such that their outer ends contact a surface of the inner shell half such as the flange 118 of the tank half shown in FIG. 2. The ejector pins extend through holes formed through the mold base 136 and through holes formed through the lifter plate 154. The inner ends of the ejector pins are affixed to ejector plate 162 which is mounted on guide rods 156 for outward movement to extend the ejector pins, and for inward movement to retract the ejector pins.

Lifter heads 150a and 150c have single protrusions 164 which form a single undercut opening in an internal wall of the inner shell half. Lifter head 150b has two protrusions 166, 168 which form the undercut openings in each of two intersecting internal walls of the inner shell half adjacent the corner formed at the intersection.

Figure 6:
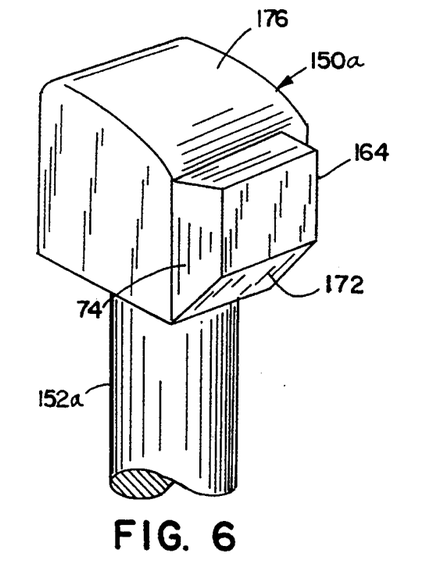
FIG. 6 is an enlarged, perspective, fragmentary view of a lifter head of the apparatus shown in FIG. 5 having a single protrusion.
Figure 10:
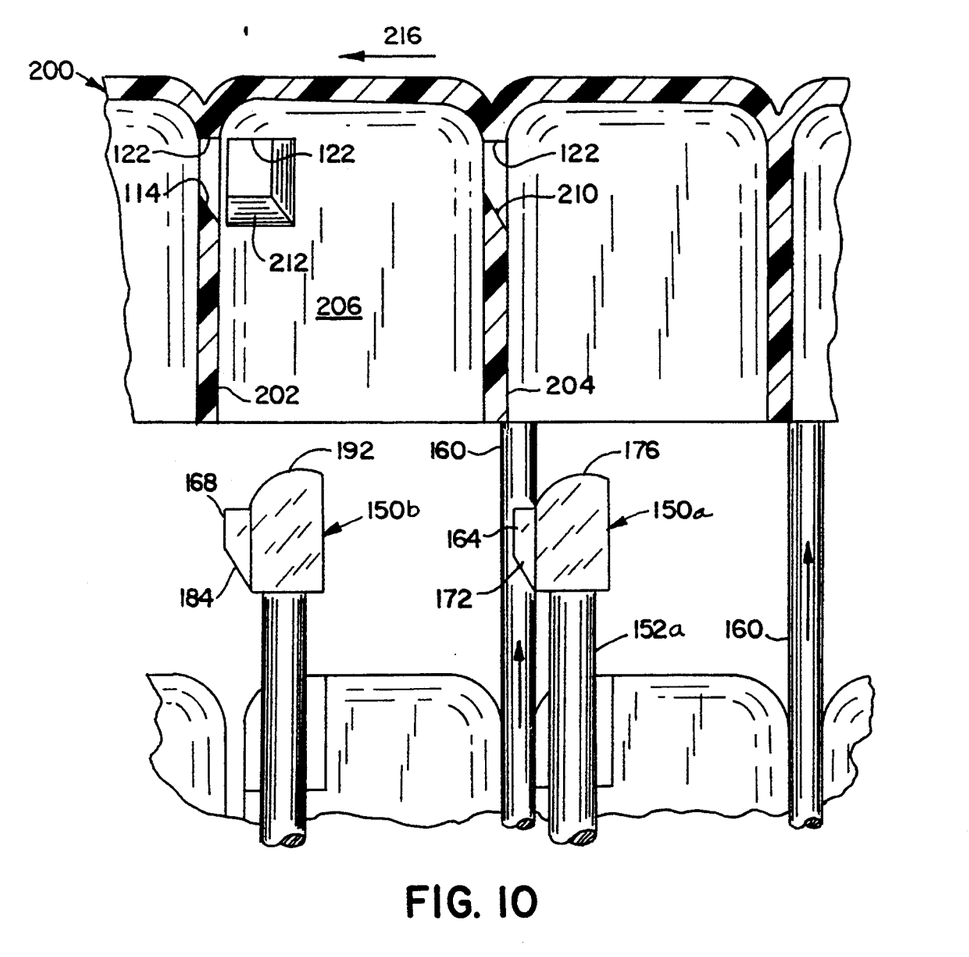
FIG. 10 is similar to FIG. 9 but showing the ejector pins fully extended.
Figure 11:
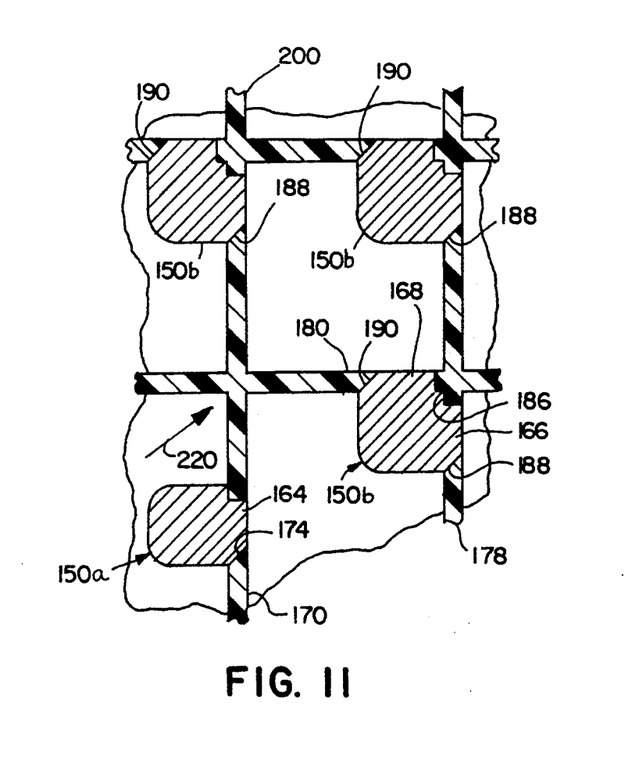
FIG. 11 is a fragmentary, plan, sectional view of an inner shell half on the lifter heads of the molding apparatus.

The details of a single protrusion lifter head 150a are shown in FIGS. 6, 10 and 11. The lifter head is enlarged with respect to the lifter rod 152a to which it is affixed. The lifter head is generally four-sided, with protrusion 164 extending transversely into the void of the male mold in which wall 170 of the inner shell half shown in FIG. 11 is formed. The inwardly directed edge of the protrusion is beveled so as to provide an inward ramping surface 172. Another edge of the protrusion extending generally parallel to the outward direction is beveled so as to provide a sloping release surface 174. The outer surface 176 of the lifter head is shaped to match the contours of the mold projection into which the lifter head is recessed when retracted.

Figure 7:
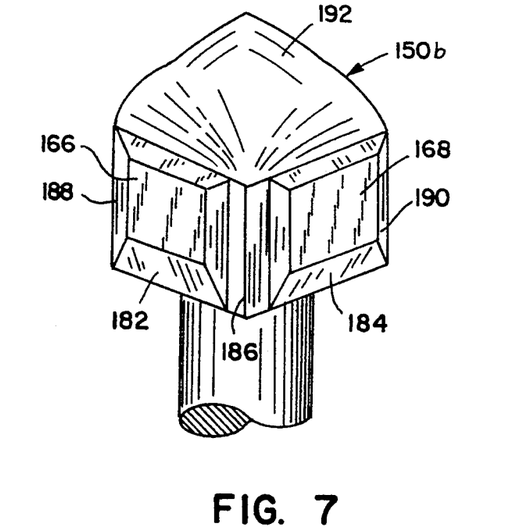
FIG. 7 is an enlarged, perspective, fragmentary view of a lifter head having two protrusions.

The details of a double protrusion lifter head 150b are shown in FIGS. 7, 10 and 11. This lifter head is also generally four sided, with protrusions 166, 168 extending transversely from adjacent sides into the voids of the male mold in which intersecting walls 178 and 180 are formed. The inwardly directed edge of each protrusions is beveled so as to provide inward ramping surfaces 182, 184. The edges of the protrusions 166, 168 opposite the corner 186 at which the walls 178 and 180 intersect, which edges extend generally parallel to the outward direction, are beveled so as to provide release surfaces 188, 190 which slope toward the corner 186. The outer surface 192 is shaped to match the contours of the mold projection into which the lifter head is recessed when retracted.

Figure 8:
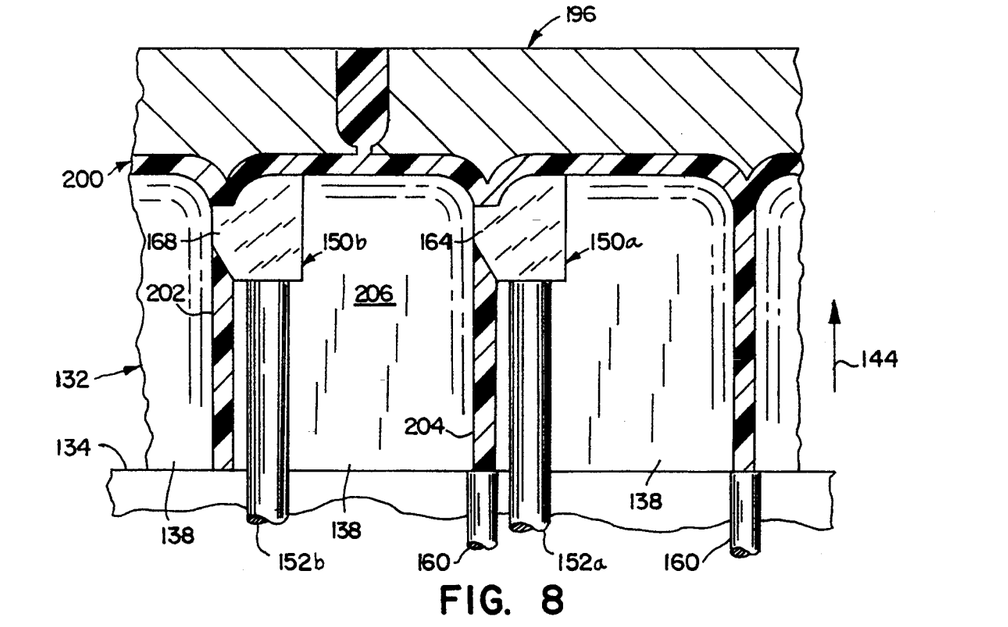
FIG. 8 is a fragmentary, elevational, sectional view of a molding apparatus similar to that shown in FIG. 5 taken along a line adjacent the lifter heads with the lifter heads and ejector pins retracted.
Figure 9:
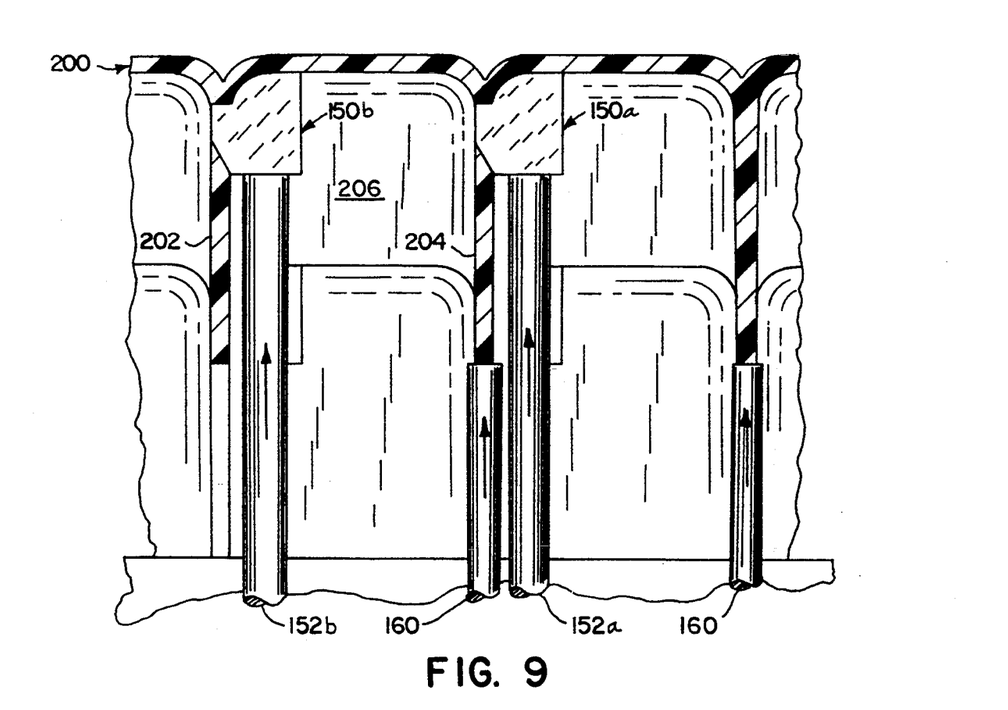
FIG. 9 is similar to FIG. 8 but showing the lifter heads fully extended and the ejector pins partially extended.

The operation of the mold is illustrated in FIGS. 8–10. As shown in FIG. 8, a molding cycle begins with the lifter heads and lifter rods, such as lifter heads 150a and 150b, retracted into the recesses of the projections 138 of the male mold 132. Ejector pins 160 are retracted so that their outer ends are flush with the mold base outer surface 134. Female mold 196 is closed in cooperation with the male mold so as to define the void in which the inner shell half will be formed.

Molten plastic is then injected into the void to form the inner shell half 200. The tank half is formed with internal walls such as walls 202, 204, and 206 formed in the voids between the projections. The direction of inner shell half removal 144 is determined by the orientation of the walls. Protrusion 164 of lifter head 150a extends transversely to the removal direction 144 into wall 104. Protrusion 168 of lifter head 150b extends transversely into wall 102. The second protrusion (not shown) of lifter head 150b extends transversely into wall 106.

Referring now to FIG. 9, when the plastic has hardened sufficiently, an appropriate driving apparatus moves lifter plate 154 and ejector plate 162 (FIG. 5) outwardly by equal rates and distances. The movement of the plates causes the lifter rods 152a, 152b and ejector pins 160 to extend outwardly from the mold. The lifter heads 150a, 150b and ejector pins 160 push the tank half 200 outwardly off the mold projections. The movement is stopped when the walls 202, 204 and 206 are clear of the mold projections.

When the lifter plate 154 reaches the limit of its outward movement, the inner shell half walls are clear of the mold projections. Then, the ejector plate continues to move outwardly. As shown in FIG. 10, the ejector pins extend to push the tank half outward off the lifter heads 150a, 150b.

The movement of the inner shell half 200 off the lifter heads is facilitated by the inward ramping surfaces 172, 184 and 182 (FIG. 7). The inward ramping surfaces of the lifter heads form correspondingly beveled faces 210, 212, 214 in the walls 204, 206, and 202, respectively, of the inner shell half. The beveled faces form a portion of the perimeter of the wall openings 122.

Still referring to FIG. 10, as the ejector pins 160 move the inner shell half outwardly off the lifter heads 150a, 150b, the sliding contact between the inward ramping surfaces 172, 184 of the lifter heads causes the inner shell half to shift transversely as indicated by arrow 216. Additionally, the inner shell half is preferably removed from the mold at a time when the plastic has cooled to a point at which the outer surface of the plastic has formed a hardened, resilient skin, yet the core of the plastic is still soft. At this point of cooling, the skin of the plastic is able to deflect to allow the inner shell half to pass the protrusions of the lifting head. The plastic also possesses a shape memory which causes the inner shell half to return to its intended shape after it has passed the lifting head protrusions. For example, for a polypropylene tank, a suitable core temperature would be approximately 275–300 degrees F., with a skin thickness of 0.015–0.020 inch.

In addition to the transverse movement represented by arrow 216, the inner shell half may also move in a transverse direction angularly offset to direction 216 to allow the second protrusion 166 (FIG. 7) of lifting head 150b to disengage from wall 206. To illustrate this feature, FIG. 11 shows a fragment of a mold according to the invention having one single protrusion lifter head 150a and several double protrusion lifter heads 150b. The release surfaces 174, 188, and 190 of the all the lifter heads are oriented in a common transverse, oblique direction, indicated by arrow 220. As the inner shell half 200 is pushed outwardly off the lifter heads by the ejector pins, the sliding contact between inward ramping surfaces 172, 182, and 184 (FIGS. 6 and 7) of the lifter heads with the beveled surfaces 210, 212, and 214 (FIG. 10) of the wall openings causes the inner shell half to shift in direction 220. The release surfaces 174, 188, and 190 allow this shift to occur.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A fuel tank comprising:
   an inner shell enclosing a space for the containment of a fuel, said inner shell formed of first and second inner shell halves and formed of molded plastic material integrally molded with intersecting, internal walls dividing the interior of said inner shell into an array of cells, said internal walls integrally molded with undercut wall openings;

an outer shell enveloping said inner shell and defining a space between said inner shell and said outer shell; and a fuel absorbent material disposed in said space between said inner shell and said outer shell.

2. The fuel tank of claim 1 wherein said fuel absorbent material is molded to fill said space between said inner shell and said outer shell.

3. The fuel tank of claim 2 wherein said fuel absorbent material is a granular material.

4. A fuel tank comprising:

an inner shell enclosing a space for the containment of a fuel, said inner shell comprising an assembly of first and second inner shell halves joined together in sealed relationship, wherein said first and second inner shell halves are formed of molded plastic material, and each said first and second inner shell halves integrally molded with intersecting internal walls dividing the interior of the inner shell half into an array of cells, said internal walls integrally molded with undercut wall openings;

an outer shell enveloping said inner shell and defining a space between said inner shell and said outer shell; and a fuel absorbent material disposed in said space between said inner shell and said outer shell.

5. The fuel tank of claim 1 wherein said outer shell comprises an assembly of first and second outer shell halves joined together in sealed relationship.

6. The fuel tank of claim of claim 5 wherein said inner shell is formed with at least one outer opening and an integrally formed neck extending outwardly from said at least one outer opening, and wherein said outer shell is formed with at least one aperture disposed in correspondence with said neck, said neck passing outwardly through said aperture, and further comprising a gasket means for forming a seal between said neck and said outer shell.

7. A fuel tank comprising:

an inner shell enclosing a space for the containment of a fuel;

an outer shell enveloping said inner shell and defining a space between said inner shell and said outer shell; and a fuel absorbent material disposed in said space between said inner shell and said outer shell;

wherein said inner shell is integrally formed with a plurality of longitudinally and laterally extending internal walls defining a plurality of internal cells, a first portion of said internal walls being disposed about the perimeter of said inner shell, a second portion of said internal walls being disposed in the center of said inner shell, wherein said internal walls disposed about the perimeter are more closely spaced than said internal walls disposed in the center.

8. A fuel tank comprising:

an inner shell for the containment of liquid fuel and comprising an assembly of first and second injection molded inner shell halves, each of said first and second inner shell halves integrally molded with intersecting longitudinally and laterally extending internal walls, said internal walls integrally molded with undercut openings, said first and second inner shells having mating perimeters sealingly joined together, said internal walls cooperating to form cells within said inner shell;

an outer shell enveloping and spaced apart from said inner shell thereby defining a space between said outer shell and said inner shell, said outer shell comprising an assembly of first and second outer shell halves having mating perimeters sealingly joined together;

a fuel absorbent material occupying substantially all of said space between said outer shell and said inner shell.

9. A fuel tank comprising:

an inner shell enclosing a space for the containment of fuel, said inner shell comprising first and second injection molded plastic inner shell halves having perimeters sealingly joined together, wherein said first and second inner shell halves are each integrally molded with intersecting internal walls dividing the interior of said inner shell into cells, said internal walls integrally molded with undercut openings allowing fuel contained in said inner shell to pass through said internal walls;

an outer shell larger than said inner shell in all directions and enveloping said inner shell, said outer shell and said inner shell cooperating to define a space therebetween enveloping said inner shell;

a fuel absorbent material filling substantially the entirety of said space between said outer shell and said inner shell, whereby fuel escaping from said inner shell is absorbed by said fuel absorbent material.

10. The fuel tank of claim 9 wherein said fuel absorbent material is molded to fill said space between said inner shell and said outer shell.

11. The fuel tank of claim 10 wherein said fuel absorbent material is a dry, granular material.

12. The fuel tank of claim 10 wherein said outer shell comprises an assembly of first and second molded plastic outer shell halves having perimeters sealingly joined together.

13. The fuel tank of claim 12 wherein at least one of said first and second inner shell halves is formed with an opening and an integral neck extending outwardly from said opening, and wherein at least one of said first and second outer shell halves is formed with an aperture disposed in correspondence with said neck, with said neck passing outwardly through said aperture, and further comprising a gasket surrounding said neck and forming a seal between said neck and the outer shell half in which said aperture is formed.

14. The fuel tank of claim 12 wherein said first and second outer shell halves are each formed with a peripheral flange, and further comprising a gasket disposed between said flanges, and a plurality of fasteners joining said flanges together.

15. The fuel tank of claim 14 wherein said first and second outer shell halves are formed with internal spacer walls, said internal spacer walls contacting said inner shell and thereby maintaining said inner shell and said outer shell in properly spaced relationship.

16. A fuel tank comprising:

an inner shell enclosing a space for the containment of fuel, said inner shell comprising first and second injection molded plastic inner shell halves having perimeters sealingly joined together, wherein said first and second inner shell halves are each integrally formed with internal walls dividing the interior of said inner shell into cells, said internal walls formed with undercut openings allowing fuel contained in said inner shell to pass through said internal walls, said internal walls extending laterally and longitudinally within said inner shell, the internal walls disposed along the perimeter of said inner shell being more closely spaced than the internal walls disposed at the center of said inner shell;

an outer shell larger than said inner shell in all directions and enveloping said inner shell, said outer shell and said inner shell cooperating to define a space therebetween enveloping said inner shell; and a fuel absorbent material filling substantially the entirety of said space between said outer shell and said inner shell, whereby fuel escaping from said inner shell is absorbed by said fuel absorbent material.

* * * * *